Patented June 9, 1925.

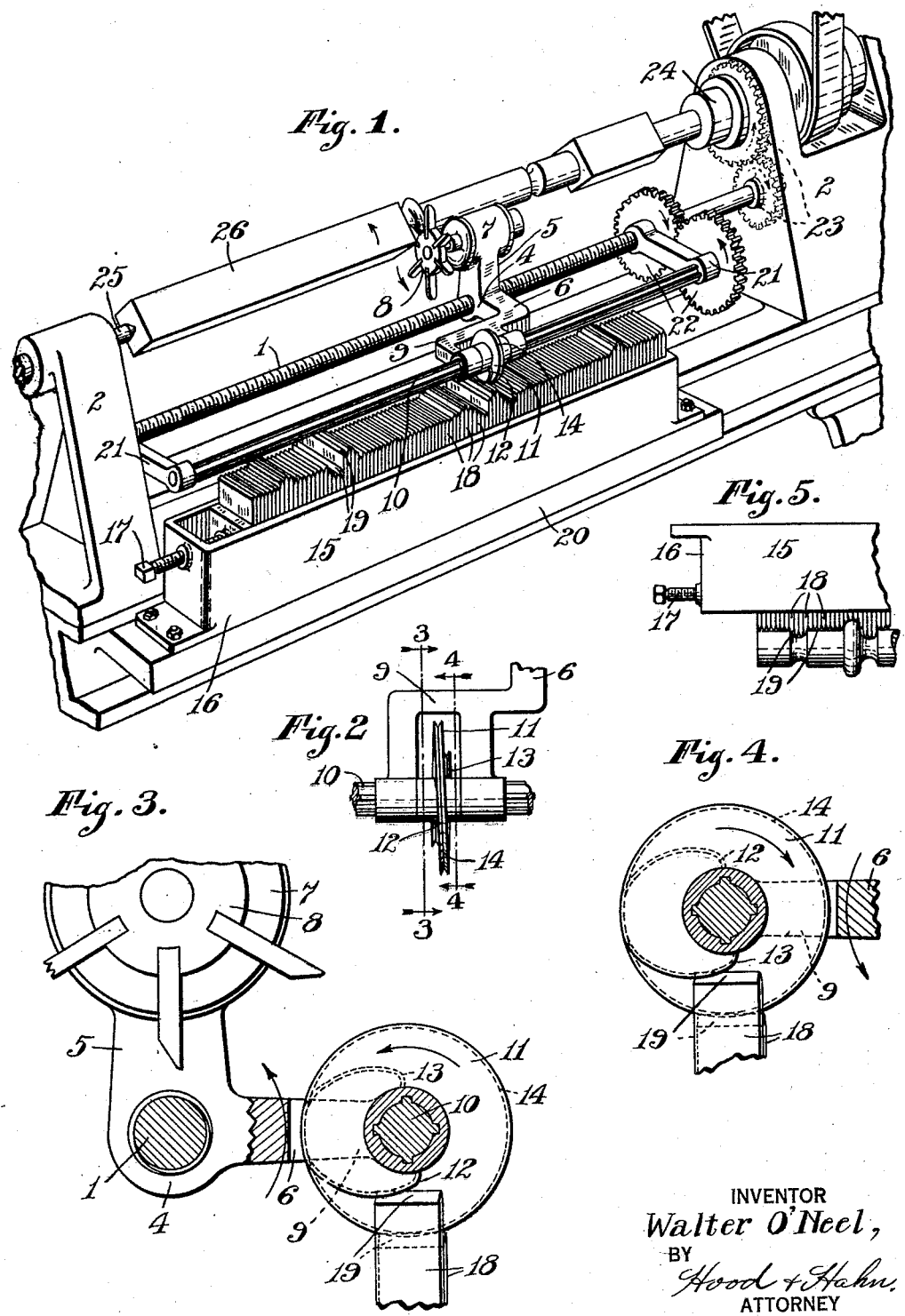

1,540,801

UNITED STATES PATENT OFFICE.

WALTER O'NEEL, OF SHELBYVILLE, INDIANA.

AUTOMATIC WOOD TURNER.

Application filed March 31, 1924. Serial No. 703,083.

*To all whom it may concern:*

Be it known that I, WALTER O'NEEL, a citizen of the United States, residing at Shelbyville, in the county of Shelby and State of Indiana, have invented a new and useful Automatic Wood Turner, of which the following is a specification.

My invention relates to improvements in turning machines and particularly to that type of turning machine in which the cutter is automatically fed to the work to produce turnings of a predetermined shape.

One of the objects of my invention is to provide an automatic guiding means for the cutter head which may be quickly and readily adjusted to cause the cutter head to move in a predetermined path.

For the purpose of disclosing my invention, I have illustrated one embodiment thereof in the accompanying drawings, in which Fig. 1 is a perspective view of a machine embodying my invention;

Fig. 2 is a detail plan of the guiding cam and associated fork;

Fig. 3 is a section taken on the line 3—3 of Fig. 2 and including the cutter head;

Fig. 4 is a section taken on the line 4—4 of Fig. 2, and

Fig. 5 is a detailed view showing the manner of adjusting the template to the pattern.

In the embodiment of the invention illustrated, a rotating threaded shaft 1 mounted in suitable journals in the end members 2 of the machine frame has mounted thereon a nut 4 having a pair of arms 5 and 6 extending at right angles to one another. The arm 5 carries a suitable electric driving motor 7 for operating the cutter head 8 which is mounted on the shaft of the motor.

The arm 6, at its free end is provided with a fork 9, the prongs of which have openings through which extends a shaft 10 and are arranged on each side of a helical cam 11 splined on the shaft 10. The face of the cam 11 spirals toward the axis thereof at opposite ends so that there is provided a helical cam surface gradually increasing in diameter from each end toward the center, as shown at 12 and 13. This cam face is grooved at 14 to co-operate with the track teeth of the rack of the template 15. The template 15 comprises a clamping frame 16 in which is secured, by means of the clamping screw 17, a plurality of individually adjustable plates 18 forming the track teeth of the template. These plates are arranged in parallel relation and at their upward ends are tapered at 19 to co-operate with the groove 14 in the cam wheel. They are also arranged at a slight angle to the path of travel of the cam so that the cam will take into engagement with them as in the threads of a screw. The frame 16 is adapted to be removably secured to the bed 20 of the machine frame and in a position beneath the line of travel of the cam wheel which, due to the fork 9, will be moved with the cutter head and along the shaft 10.

The shaft 10 is mounted in journal arms 21 pivoted on the shaft 1 and is rotated by a gear connection 22 with said shaft 1. The shaft 1 is driven by a suitable gear train 23 from the driving chuck 24 of the lathe chucks 24 and 25, in which the work is held and adapted to be rotated in the same direction as that of the cutter head 8.

In operation, the template is adjusted to the pattern preferably by removing the same from the machine bed and reversing it above the pattern so that when the teeth are loosened they will assume the configuration of the pattern, as shown in Fig. 5. The track teeth are then locked in their adjusted position and the template bolted to the machine frame in position beneath the line of travel of the cam wheel 11. The blank 26 is inserted in the chucks 24 and 25 and the machine started with the cutter head 8 at the extreme right of the machine. The threaded shaft 1 with the nut 4 causes the cutter head to move across the face of the blank 26 and the cam wheel 11 to move along the shaft 10. At the same time, this cam wheel is rotated, by the shaft, in engagement with the track teeth 18 and at the points where the teeth project upwardly, and due to the spiral arrangement, the cam wheel will ride from one tooth to the next succeeding tooth and where the teeth form a series of steps upwardly, will ride up on each succeeding tooth, and where the teeth form a series of downward steps, will correspondingly ride on each decending tooth, thereby causing the cutter head to move further toward or away from the center of the blank, causing the same to be cut in exact duplication of the pattern from which the template has been adjusted.

Due to this construction, after the template has once been adjusted, the pattern may be dispensed with and used for adjusting other machines, or stored away for future use. By my construction there is no wear and tear upon the pattern itself, so that these patterns, which are expensive to make, will last indefinitely, while at the same time the template may be readily adjusted to produce exact reproductions of the patterns.

I claim as my invention:

1. In a machine of the character described, the combination with a cutter head, of a support therefor and means for causing said support to oscillate, including a template having a plurality of track teeth of different elevations and a helical cam arranged to engage said teeth.

2. In a machine of the character described, the combination with a cutter head, of a support therefor, a template for said cutter head, including a plurality of separately adjustable track teeth and a helical cam connected to said support and co-operating with said teeth.

3. In a machine of the character described, the combination with a cutter head, of means for oscillating said head including a plurality of track teeth having different elevations, and a helical cam spiraling towards its axis at each end and co-operating with said support.

4. In a machine of the character described, the combination with a cutter head, of means for oscillating said head including a plurality of track teeth separately adjustable, and a helical cam spiraling towards its axis at each end.

5. In a machine of the character described, the combination with a cutter head, of means for feeding the same across the face of the work, and means for causing said head to oscillate to and from the work including a plurality of track teeth, and a rotatable spiral cam co-operating with said tracks and traveling with said cutter head.

6. In a machine of the character described, the combination with a cutter head, of a support for said head, means for moving said support to cause the head to move along the face of the work, a helical cam rotatably mounted on said support and spiraling at each end towards its axis, a template co-operating with said cam and having a plurality of separately adjustable track teeth arranged to be engaged by said cam and means for rotating said cam.

7. In a machine of the character described, the combination with a cutter head, of a supporting arm for said head carrying the head at one end thereof, of a feeding screw on which the arm is oscillatingly mounted and adapted to feed the head across the face of the work, a helical cam spiraling at its opposite ends towards the axis connected to the opposite end of said arm, a rotatable shaft on which said cam is splined for rotating the cam while permitting it to be moved with the arm, and a template having a plurality of track teeth separately adjustable and adapted to be respectively engaged by said cam.

In witness whereof, I WALTER O'NEEL have hereunto set my hand at Indianapolis, Indiana, this 11th day of March, A. D. one thousand nine hundred and twenty four.

WALTER O'NEEL.